March 24, 1970      H. J. FRANK      3,501,954

VERTICAL VELOCITY INDICATOR

Filed June 3, 1968

Herbert J. Frank
INVENTOR.

BY Stefan M. Stein
ATTORNEY

3,501,954
VERTICAL VELOCITY INDICATOR
Herbert J. Frank, 8 Country Club Road,
Largo, Fla. 33540
Filed June 3, 1968, Ser. No. 733,993
Int. Cl. G01c 21/10
U.S. Cl. 73—179                                   7 Claims

ABSTRACT OF THE DISCLOSURE

A vertical velocity indicator for aircraft capable of standard or instantaneous readings by the use of a valve which, in accordance with preselection by the pilot, connects the diaphragm which senses atmospheric pressure changes to a restricted orifice of a "G" responding pneumatic pump.

---

This invention relates to a vertical velocity indicator for aircraft and more particularly to a vertical velocity indicator which uniquely enables both standard and instantaneous accurate readings of the rate of climb of said aircraft.

The standard vertical velocity indicator currently available provides a stable indication under almost all flight conditions. However, the design of the instrument incorporates a time lag of from three to fifteen seconds which enables the pilot to only utilize it as a "history" or "reference" type indicator. Such as undesirable when the pilot must ascertain his rate of climb at the moment such as in airport approach maneuvering.

In recent years, an instrument which enables instantaneous indication has been devised. Such an instantaneous vertical velocity indicator utilizes a vertical acceleration sensing unit coupled to the standard vertical velocity mechanism which removes the "time lag." It brings the instrument from the "history" status into the "control loop" of the pilot, and enables him to more accurately control the rate of ascent or descent. This is particularly useful in the precise G.C.A. and I.L.S. approaches recently adopted.

Unfortunately, the instantaneous indicator has a predictable error factor when subjected to banks exceeding 30°. This error is 100 to 150 feet per minute at 30° and increases as the bank angle increases. This error is induced by the "G" forces which emanate from the angle of the bank and are transmitted to the aircraft vertical center line. Another predictable error condition of the instantaneous indicator is the time factor for stabilization of the indicator after inverted flight. A few seconds are required for this stabilization.

Because of these factors, some pilots continue to prefer the standard indicator over the instantaneous indicator even though they cannot use the standard indicator for precise approaches and other uses.

An object of this invention is to provide a vertical velocity indicator which incorporates the best of both instruments into one unit.

Another object is to provide a vertical velocity indicator which enables the pilot to accurately ascertain his rate of climb (or descent) at any instant so that it can be easily translated to the "feel" of his aircraft.

Still another object is to provide a vertical velocity indicator of the above character wherein the rate of climb (or descent) is accurately indicated, with stability, even in high angle banks.

A further object is to provide a vertical velocity indicator of the above character wherein an instant response indication is possible for precise approaches.

Other objects of the invention will in part be obvious and will in part appear hereinafter.

A vertical velocity indicator for aircraft has now been devised which enables selective readings of either standard or instantaneous rate of climb (or descent) determinations. In its most basic form, the indicator comprises a diaphragm responsive to pressure within the instrument, as compared to atmospheric pressure outside the instrument. The interior of the instrument bleeds to the atmosphere via a restricted orifice adjusted by a rate screw. The pressure within said diaphragm is selectively varied with respect to said atmospheric pressure or pressure induced by a gravity responsive piston within a cylinder block. The means to accomplish such comprises a 3-way valve controlled by an external selector knob. The knob is located on the face of the instrument whereby the pilot can easily "flip" the instrument response from a standard to an instantaneous rate of climb reading.

The invention accordingly comprises the several steps and the relation of one or more of such steps with respect to each of the others thereof, which will be exemplified in the method hereinafter disclosed, and the scope of the invention will be indicated in the claims.

For a fuller understanding of the nature and objects of the invention, reference should be had to the following detailed description taken in connection with the accompanying drawings in which.

Similar reference characters refer to similar parts throughout the several views of the drawings.

Figure 1:
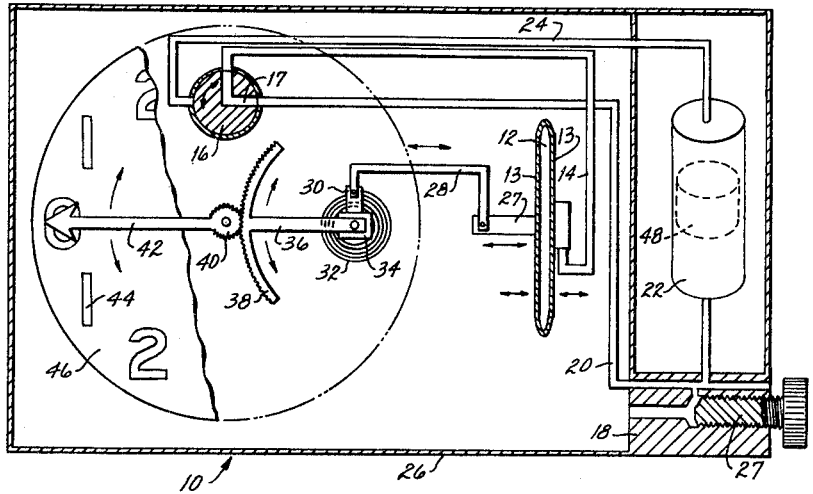
FIG. 1 is a diagrammatic view of the basic elements of the new instrument of this invention.

Referring to the diagrammatic view of the instrument shown in FIG. 1, the instrument 10 basically comprises an air pressure responsive diaphragm 12 of usual structure. Communicating with the interior of the diaphragm is a selector valve-diaphragm tube 14, which connects with the rate of climb reading selector valve 16. Valve 16 is a 3-way valve permitting communication of tube 14 and hence the interior of diaphragm 12 with atmosphere vent plug 18 via atmosphere vent plug tubing 20. Valve 16 also permits communication of tube 14 and hence the interior of diaphragm 12 with pneumatic pump 22 via pneumatic pump tubing 24.

The instrument 10 is housed within a case 26. Its interior is vented to the atmosphere by a restricted orifice vent plug 27, the orifice of which is adjustable by the instrument maker. The orifice is adjusted in such manner as to provide a lag in the equalization of pressure between the interior and the exterior of the diaphragm 12. Thus, as the aircraft ascends or descends, pressure within the diaphragm 12 decreases or increases, respectively, to a greater extent than the pressure within case 26. In response, the side walls 13, usually corrugated, of the diaphragm, bow inwardly or outwardly, respectively, to equalize the pressure on each side of the side walls until the pressure inside the diaphragm "catches up" to the pressure on the outside of the diaphragm. Such action is tracked by diaphragm movement tracking pin 27; hence, in this mode of operation, it is a history type instrument.

Pin 27 actuates pin follower 28, the far end of which pivotally connects to hairspring lever 30. Lever 30 increases or decreases the tension force of hairspring 32. The variation in tension force is absorbed by rotatable torsion bar 34. Bar 34 pivots rack lever 36 and hence rack 38 in accordance with its absorption of the tension force of hairspring 32. Rack 38 drives indicator pointer gear 40 which in turn pivots indicator pointer 42 to point to a reading 44 on dial face 46.

For instantaneous response, pneumatic pump 22 is placed in circuit with diaphragm 12 by rotating reading selector valve 16 (counterclockwise in the diagrammatic view of FIG. 1), and hence L-shaped passage 17 to connect the interior of diaphragm 12 with the interior of pump 22. Pump 22 contains a weighted freely moving piston 48 suspended by springs not shown which responds to gravity as the plane ascends or descends. In so doing, the piston 48 causes the pressure within pneumatic pump tubing 24 to increase or decrease respectively. This, in turn, increases or decreases the pressure within diaphragm 12 and similar action as that described above with respect to pin 27, follower 28 and finally, indicator pointer 42. Pump 22 is vented to the atmosphere via vent plug 18. Since piston 48 responds almost instantaneously to gravity force, it should be evident that an instantaneous reading may be obtained when valve 16 is so disposed. It should also be evident that the pilot can easily flip the valve 16 from standard to instantaneous reading in accordance with his needs so that a dual instrument is provided.

Figure 2:
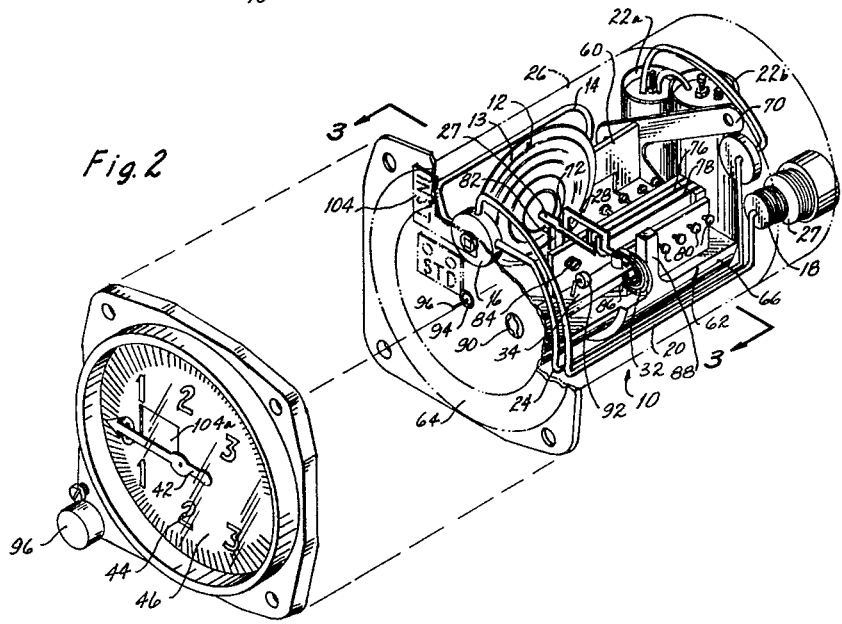
FIG. 2 is a broken perspective view of the actual instrument as used in aircraft.
Figure 3:
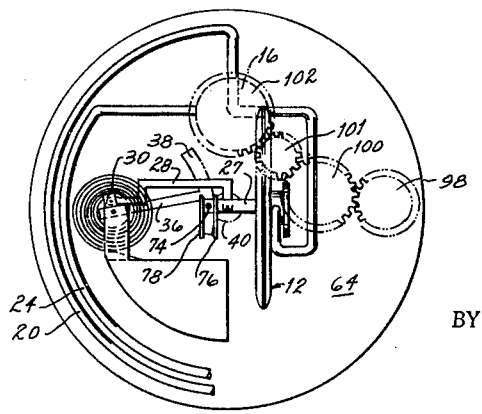
FIG. 3 is a cross-sectional view of the instrument of FIG. 2, taken along line 3—3.

FIGS. 2 and 3 show an actual instrument, as it might appear ready for installation in an aircraft. Those parts shown in FIG. 1 are similarly identified in these FIGS. 2 and 3.

The instrument 10 is contained in a hollow closed cylindrical case 26. There is a diaphragm 12 with corrugated walls 13. Restricted orifice vent plug 27, which contains a restrictor screw (not shown) adjusted by the instrument maker to effect the desired lag in equalization of pressure within and without diaphragm 12 is located at the back of the case 26.

The diaphragm is disposed on diaphragm support stand 60 secured to instrument frame 62. Frame 62 basically comprises a circular faceplate 64 with a rearwardly extending table 66.

Selector valve-diaphragm tube 14 extends from the hub of the diaphragm 12 to selector valve 16 affixed to the back of faceplate 64. Atmosphere vent plug tubing 20 and pneumatic pump tubing 24 extends from the valve 16. In the preferred form, tubing 20 and 24 comprise aluminum tubing.

Vent plug tubing 20 leads to atmosphere vent plug 18, at the back of the instrument.

Pneumatic pump tubing 24 connects to pump 22 (in this instance, two separate pumps 22a and 22b connected in series to heighten the effect of gravity). Pump 22 is usually mounted via pump mounting bracket 70 to the back wall outside the closed interior of case 26 and is independently vented to the atmosphere.

Extending from the diaphragm 12 (toward the reader in FIG. 2) is the diaphragm movement tracking pin 27, which actuates the angular pin follower 28. To provide for accurate follower action and adjustment in the event such is required, the actuating means between the pin 27 and the follower 28 comprise a pin slot 72, one wall of which is elongate and contains a pin follower actuating stop pin 74. The extent of movement of pin 74 is governed by retard frame 76 which has two forwardly extending (toward the dial face) leaf springs 76 and 78 which span pin 74 at their forward end. The spring response of each leaf spring is adjustable by a plurality of spring retard screws 80 along each wall of the retard frame 76.

Frame 76 also contains an upward extending diaphragm tracking pin guide 82, the vertical disposition of which is governed by guide adjustment screw 84.

Pin follower 28 is pivoted to hairspring lever 30. Lever 30 extends through torsion bar 34. The extent to which it protrudes from the top surface of the torsion bar 34, which affects the angle of movement, and hence the response between follower 28 and bar 34 is adjustable. Set screw 86 sets the adjustment, once made.

The rear end of torsion bar 34 is supported by an adjustable jewel bearing (not shown) with torsion bar post 88 extending upwardly from table 66. The front end of torsion bar 34 is similarly supported by a jewel bearing (not shown), the adjustment of which is accomplished via torsion bar front bearing screw 90. Counterweight 92 further balances the movement of torsion bar 34.

Hairspring 32 encircles the rear end of bar 34. Its inner end is secured to bar 34 and its outer end is secured to table 66. It biases the torsion bar in a clockwise manner.

Rack lever 36 with integral rack 38 is secured to the front of the torsion bar 34. As bar 34 pivots, so does rack lever 36. This causes rack 38 to rotate pointer gear 40. Gear 40 is journalled at the center of the faceplate 64 within a pointer gear jewel bearing journal 94. An indicator shaft 96 extends forwardly. To it is affixed the indicator pointer 42. The pointer points to various readings 44 on face 46.

Instrument reading selector knob 96 extends forwardly from the front face of the instrument. Referring to FIG. 3, it can be seen that it is directly connected to knob gear 98, which meshes with a series of follower gears 100 to 101, and then selector valve gear 102. Thus, as the pilot "flips" knob 96 back and forth through a 90° turn, he "flips" the selector valve from a standard to an instantaneous reading. A flag 104, to show that an instantaneous reading is launched, may also be used. It is affixed to the axle of the selector valve 16. When flipped upwardly by a clockwise rotation of knob 96, the reading will be shown as "Std" due to such an imprint on faceplate 64.

It should be evident that the specific instrument structure shown in FIGS. 2 and 3 just described is not particularly critical to the basic elements and mode of operation diagrammatically illustrated in FIG. 1. Certain elements may be omitted or relocated dependent upon the specification of the aircraft involved. And, additional structure and features, such as jewel bearings exclusively, adjustable eccentric stops for the pointer, a zero reset mechanism such as used in ordinary vertical velocity altimeters, fluorescent or matte white markings and pointer with a dull black background, integral lighting, and similar "extras" may be included.

It will thus be seen that the objects set forth above, among those made apparent from the preceding description, are efficiently attained, and since certain changes may be made in carrying out the above method and in the construction set forth without departing from the scope of the invention, it is intended that all matter contained in the above description or shown in the accompanying drawings shall be interpreted as illustrative and not in a limiting sense.

Now that the invention has been described:
What is claimed is:

1. A vertical velocity indicator capable of preselected standard and instantaneous climb reading comprising a case with its interior vented to the atmosphere by an adjustable restricted orifice, a rate of climb dial on the front face of the case, an air pressure responsive diaphragm within said case, the interior of said diaphragm communicating with a climb reading selector valve, said valve selectively communicating with an atmosphere vent orifice which vents to the atmosphere outside said case and the interior end of at least one gravity actuated pneumatic pump, the exterior end of said pump being vented to said atmosphere, a pointer acting in conjunction with said dial and linkage between said diaphragm and said pointer whereby said pointer will point to a reading on the face of said dial in accordance with the vertical velocity of the aircraft in which said indicator is mounted and the selected communication of the valve with said atmosphere vent orifice and said pump.

2. The vertical velocity indicator of claim 1 wherein said rate of climb dial includes a flag operatively connected to said selector valve to give an indication of instantaneous reading on the face of the dial.

3. The vertical velocity indicator of claim 1 wherein said valve comprises a rotatable mandrel type 3-way valve, one passage of said valve communicating with said interior of said diaphragm, the second passage communicating with said atmosphere vent orifice and the third passage communicating with the interior end of said gravity actuated pneumatic pump.

4. The vertical velocity indicator of claim 3 wherein said mandrel of said valve is manually rotatable by a knob extending through the face of said case, with a gear train interspaced between said knob and said mandrel.

5. The vertical velocity indicator of claim 1 wherein said linkage comprises a tracking pin secured to one outside wall of said diaphragm to track the movement of said wall, a pin follower, a torsion bar extending axially within said case, said pin follower operatively connected to said bar, said bar being operatively connected to said pointer.

6. The vertical velocity indicator of claim 5 wherein said torsion bar is supported at both ends in jeweled bearings, a hairspring rotatably biasing said torsion bar, the dial face end of said bar having a rack lever, a rack operatively connected to said pointer, said rack being geared to said rack lever.

7. The vertical velocity indicator of claim 5 wherein said tracking pin has a stop pin bounded by two leaf springs, the spring response of said leaf springs being adjustable.

References Cited

UNITED STATES PATENTS

| 2,973,643 | 3/1961 | Roderick et al. | 73—179 |
| 3,262,312 | 7/1966 | Angst | 73—179 |

DONALD O. WOODIEL, Primary Examiner